(12) United States Patent
Vilain

(10) Patent No.: US 7,241,998 B2
(45) Date of Patent: Jul. 10, 2007

(54) MICROBOLOMETER AND ITS MANUFACTURING METHOD

(75) Inventor: Michel Vilain, Saint-Georges-de-Commiers (FR)

(73) Assignee: Commissariat a l'Energie Atomique, Paris Cedex (FR)

( * ) Notice: Subject to any disclaimer, the term of this patent is extended or adjusted under 35 U.S.C. 154(b) by 129 days.

(21) Appl. No.: 10/482,237

(22) PCT Filed: Jun. 18, 2002

(86) PCT No.: PCT/FR02/02096

§ 371 (c)(1),
(2), (4) Date: Jun. 28, 2004

(87) PCT Pub. No.: WO03/002963

PCT Pub. Date: Jan. 9, 2003

(65) Prior Publication Data

US 2004/0232337 A1    Nov. 25, 2004

(30) Foreign Application Priority Data

Jun. 28, 2001 (FR) .................................. 01 08552

(51) Int. Cl.
*G01J 5/00* (2006.01)
(52) U.S. Cl. .................................. 250/338.1
(58) Field of Classification Search .............. 250/338.1
See application file for complete search history.

(56) References Cited

U.S. PATENT DOCUMENTS

| | | | | |
|---|---|---|---|---|
| 5,656,816 A * | 8/1997 | Tanaka | ...................... | 250/338.1 |
| 6,080,988 A | 6/2000 | Ishizuya et al. | | |
| 6,091,050 A * | 7/2000 | Carr | ........................... | 219/201 |
| 6,198,098 B1 * | 3/2001 | Laou | ........................ | 250/338.1 |
| 6,469,301 B1 * | 10/2002 | Suzuki et al. | ............. | 250/338.1 |
| 6,621,083 B2 * | 9/2003 | Cole | ........................ | 250/338.1 |

FOREIGN PATENT DOCUMENTS

WO        WO 00/40938 A1     7/2000

* cited by examiner

*Primary Examiner*—Constantine Hannaher
(74) *Attorney, Agent, or Firm*—Brinks, Hofer, Gilson & Lione

(57) ABSTRACT

The invention concerns a microbolometer comprising a suspended part containing radiation-sensitive elements and consisting of a set of first zones and a set of second zones, the two sets being superimposed; furthermore, the materials constituting said zones and have thermal expansion coefficients sufficiently different for said suspended part to be deformed under the effect of a rise in temperature to be urged into contact with the substrate when the contact zone reaches a temperature $T_c$ less than the destruction temperature $T_d$ of the microbolometer. The invention is applicable to radiation detectors comprising an assembly of such microbolometers, and to various appliances comprising at least such a radiation detector.

16 Claims, 8 Drawing Sheets

MICROBOLOMETER AND ITS MANUFACTURING METHOD

PRIORITY CLAIM

This application claims priority to French Patent Application No. 0108552, filed Jun. 28, 2001

TECHNICAL FIELD

The invention relates to the manufacture of microbolometers, and radiation detectors comprising an array of microbolometers.

BACKGROUND

A bolometer is a device designed to measure the intensity of radiation, usually situated in the infrared, to which it is subjected, by transforming the energy of this radiation into thermal energy. The resultant heating of the bolometer causes the variation of an electric variable such as the electrical resistance of a conductor connected to a circuit outside the bolometer. In the case for example of a detector comprising a microbolometer matrix, this electric circuit, referred to as "readout" circuit, performs the functions of matrix addressing and reading stimuli sent to each microbolometer, and converts the resultant signals to a format that can be used in particular for imaging (for example in the form of a video signal). In order to obtain the best possible performances, the microbolometers are operated under a relatively low gas pressure (or under moderate pressure of a gas with low thermal conductivity), in order for the thermal dissipation due to this gas to be negligible vis-à-vis the intrinsic thermal conductance of the microbolometers.

The readout circuit measures the relative variation of said electric variable (attached to the bolometer's sensitive element) which depends on the temperature. In the case of non-cooled detectors (which are simpler and less expensive than detectors equipped with a cooling system), the bolometer's temperature variation is for its part proportional to the power of radiation received, the proportionality constant (called "thermal resistance" and which we shall designate $R_{thb}$) usually being between $5 \cdot 10^6$ and $2 \sim 10^7$ K/W.

FIG. 1 relates to a standard microbolometer with a useful surface area of 40 µm×30 µm, having a thermal resistance $R_{thb}$ equal to $10^7$ K/W and unit absorption, placed at the focus of an optical system having an aperture angle of 53° equipped with a spectral filter offering a constant transmission equal to 0.9 in the infrared (more precisely, within a range of wavelength between 8 and 14 µm). The curves represent the radiation power received and the increase in temperature of the microbolometer as a function of the temperature of the radiation source, regarded as a "black body". This heating takes place even if the imaging system is not in operation (i.e. in the absence of electrical stimuli).

For a microbolometer provided with a "perfect" spectral filter, i.e. having zero transmission for all the wavelengths outside the abovementioned range, the increase in the microbolometer's equilibrium temperature with the temperature of the source (solid curve) is linear once the latter exceeds 2000 K. For example, the static observation of a source such as the sun (approximately 6000 K) causes an increase of the order of 100 K in the temperature of the microbolometer.

In practice, the spectral filters, even those of good quality, installed in infrared imaging systems are not perfect, in that they allow the passage of a low, but not zero, power of radiation at wavelengths situated outside the filter's theoretical operating range. Very hot sources however emit much more power in the visible range than in the infrared. Therefore, the optical power received on the detector, outside the filter's infrared theoretical range, can be considerable, and even, on occasion, preponderant with a very high source temperature and/or for filters of mediocre quality. In this case, the heating estimate indicated previously can be considerably lower than the actual value. The dashed curve in FIG. 1 shows the effective variation in the temperature of the microbolometer when it is provided with a "non-perfect" filter, having a transmission equal to $10^{-3}$ outside the abovementioned infrared range. Of course, the use of higher thermal resistances, advantageous under normal conditions of use since they increase the microbolometer's sensitivity, means even greater heating.

Microbolometers are usually designed to operate, and this is one of their advantages, close to the ambient temperature. But these microbolometers are constituted by materials (such as vanadium oxides or amorphous silicon) which exhibit a permanent, or at least durable change in their electrical characteristics (and also possibly mechanical deformation of their structure) for such rises in temperature, even temporary. Very high illuminations can even lead to their physical destruction.

Moreover, even if temporarily over-illuminated microbolometers are not destroyed, a change, even temporary, in the electrical resistance values of the image points (probable or inevitable beyond 100 to 200 K heating, for most of the microbolometers) renders inoperative the "offset" compensation electrical device, usually integrated in the readout circuit, which has been calibrated for the original spatial distribution of the individual resistances on the microbolometer.

Consequently, the observation, even transient (over a period of the order of the microbolometer's thermal time constant, i.e. usually from some milliseconds to some tens of milliseconds) of very hot sources, for example the filament of an incandescent lamp (approximately 3000 K), or the sun, is usually fatal for this type of device.

As imaging systems based on detectors of the bolometric type according to the state of the art are not compatible with the observation, even temporary or accidental, of very intense sources, it is necessary to limit the use of these systems to environments that are essentially not very aggressive, or to take constraining precautions during the use of such systems.

SUMMARY

The object of the invention is to propose microbolometers that are less vulnerable to over-illuminations than are the standard microbolometers, thanks to an extension of the range of admissible radiation intensities, without however reducing the device's sensitivity to moderate radiation intensities.

To this end, the invention proposes a method for manufacturing microbolometers on a substrate, said method being remarkable in that it comprises in particular, for each microbolometer, the following steps:

the deposition and etching of several layers, including a set of layers intended to constitute a suspended part of the microbolometer containing a radiation-sensitive element, and the formation in said suspended part of a set of first zones and a set of second zones, the two sets being superimposed, and in that the materials constituting said first zones possess thermal expansion coefficients sufficiently different from the materials constituting said second zones for the suspended part to be deformed under the effect of a rise in temperature to the point of coming into contact with the substrate when the contact zone reaches a temperature $T_c$ below the destruction temperature $T_d$ of the microbolometer.

By means of these arrangements, from the moment when the suspended part of the microbolometer, during use, reaches said temperature $T_c$, this part cools down due to its contact with the substrate. The microbolometers according to the invention can consequently support a considerably extended range of scene temperatures compared with the microbolometers according to the prior art.

It will be noted that the microbolometers according to the invention can be entirely manufactured using microelectronics techniques, and in collective manner.

Correlatively, the invention relates to a microbolometer comprising a suspended part containing a radiation-sensitive element, said microbolometer being remarkable in that said suspended part is constituted by a set of first zones and a set of second zones, the two sets being superimposed, and in that the materials constituting said first zones possess thermal expansion coefficients sufficiently different from the materials constituting said second zones for the suspended part to be deformed under the effect of a rise in temperature to the point of coming into contact with the substrate when the contact zone reaches a temperature $T_c$ below the destruction temperature $T_d$ of the microbolometer.

Thus, the microbolometers according to the invention comprise, by virtue of their very constitution, suitable elements for protecting them against high scene temperatures.

Said first zones can, according to the particular needs of a person skilled in the art, be situated either "below" or "above" said second zones. Given that the first zones can, optionally, possess a thermal expansion coefficient smaller or greater than that of the second zones, the suspended part of the microbolometer according to the invention will be deformed under the effect of a rise in temperature into a shape which can be convex or concave.

According to preferred characteristics, the microbolometer according to the invention will have protuberances emerging from the suspended part and turned towards the substrate and/or protuberances emerging from the substrate and turned towards the suspended part.

By means of these arrangements, when the suspended part comes, according to the invention, into contact with the substrate, the zones of effective contact get to be limited to the top of said protuberances. This prevents the suspended part adhering too strongly to the substrate, and therefore facilitates the return of the suspended part to its nominal position when the microbolometer cools down.

According to other preferred characteristics, the suspended part of the microbolometer includes support arms resting locally on the substrate by means of struts.

By means of these arrangements, the suspended part is firmly held, even when it is deformed under the effect of a rise in temperature, by these support arms, which for their part will expand relatively little, as one of their ends is kept at the temperature of the substrate by means of said struts.

Finally it will be noted that, depending on the choices of materials and structure made by a person skilled in the art, the zone of the suspended part of the microbolometer intended to come into contact with the substrate at the temperature $T_c$ can comprise the centre of the suspended part, or can be remote from this centre.

The invention also relates to radiation detectors each comprising an array of microbolometers as described briefly above, and various observation or measurement devices incorporating at least one such radiation detector. These devices can for example be imaging systems operating in the infrared.

BRIEF DESCRIPTION OF THE DRAWING

Other aspects and advantages of the invention will become apparent on reading the detailed description to be found below, of particular embodiments given as non-limiting examples. This description refers to the annexed drawings, in which:

FIG. 2b is a sectional view along the line AA of the assembly illustrated in FIG. 2a;

FIG. 3b is a sectional view along the line AA of the assembly illustrated in FIG. 3a;

FIG. 4b is a sectional view along the line AA of the assembly illustrated in FIG. 4a;

FIG. 5b is a sectional view along the line AA of the assembly illustrated in FIG. 5a;

FIG. 6b is a sectional view along the line AA of the assembly illustrated in FIG. 6a;

FIGS. 7a and 7b illustrate the operation of a microbolometer constructed according to the first embodiment of the invention, FIG. 7a being a top view and FIG. 7b a sectional view along the line AA of FIG. 7a;

FIGS. 8a and 8b illustrate the operation of a microbolometer constructed according to a second embodiment of the invention, FIG. 8a being a top view and FIG. 8b a sectional view along the line AA of FIG. 8a.

DETAILED DESCRIPTION

To begin with, a description will be given of the successive steps of a method for manufacturing microbolometers according to a first embodiment of the invention.

Figure 2A:
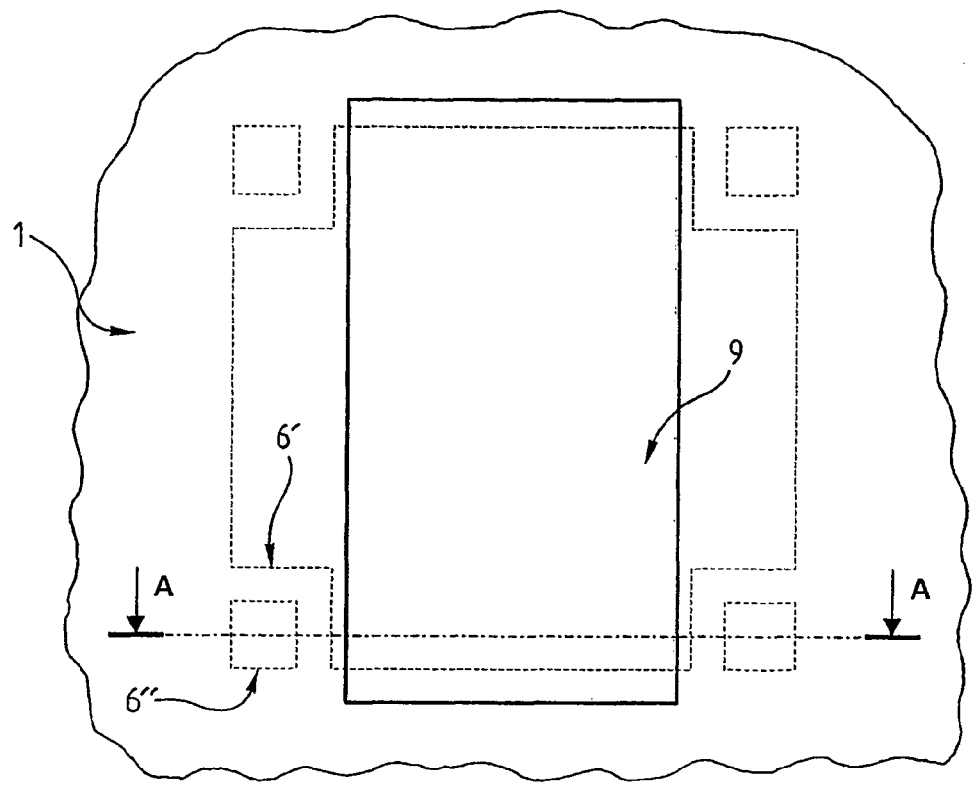
FIG. 2a is a top view of the assembly obtained after a first step in the manufacture of microbolometers according to a first embodiment of the invention.
Figure 2B:
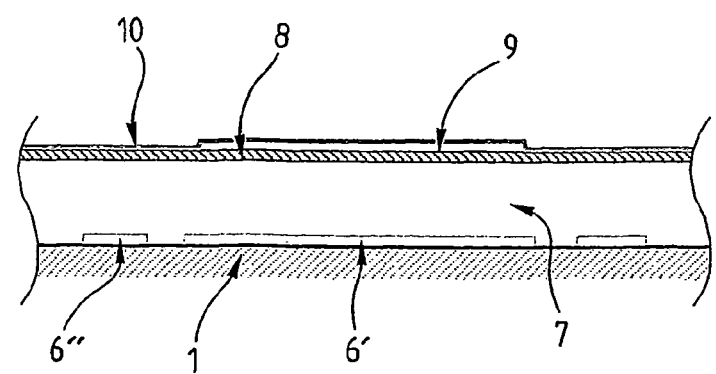

FIGS. 2a and 2b respectively show a top view and a local section of the assembly obtained after a first step of this method.

Initially, in standard manner, there are placed in a substrate 1 (usually of silicon, and a few µm thick), electric circuits (not represented), capable of providing, on the one hand, the reading stimuli for the microbolometers, and on the other hand the processing of the signal resulting from the illumination of these microbolometers via a suitable optical system.

The microbolometers are usually arranged in order to form a matrix or a strip. The usual dimension of an elementary microbolometer in each direction parallel to the substrate 1 is usually of the order of 20 to 50 µm.

The standard methods for manufacturing detectors of this type comprise initial steps carried out directly on the surface of an electric circuit, in "monolithic" (i.e. in a continuous sequence of operations on the same substrate) or "hybrid" mode (with application to a substrate of prefabricated elements). These steps involve usual techniques of the microelectronics industry, in particular mass-production techniques, usually involving some tens to some hundreds of detectors arranged on the same substrate ("wafer level"). During these initial steps, the actual bolometric units ensuring the optical absorption functions and having a resistance that can vary with the temperature are placed on the surface of a "sacrificial" layer, which means that this layer (usually made of polyimide, polycrystalline silicon, or of metal such as copper or aluminium) is eliminated at the end of the process (by combustion in an oxygen plasma for example in the case of polyimide), in order to leave the microbolometer structures suspended above the substrate.

By means of this production method, the space between two adjacent microbolometers can be kept to a minimum, in order to allow their physical and electrical separation with a maximum fill factor.

It will be assumed in order to simplify the present description that no microbolometer has any part in common with the adjacent microbolometers. In other cases, a person skilled in the art will be able to adapt the manufacturing steps, making use of his ordinary abilities.

In accordance with the established art, there is deposited on the substrate 1 a metal layer 6, for example of aluminium, which is defined by subsequent etching, for example, the contour indicated in FIG. 2a (dotted line) by means of a first lithographic mask. This layer 6 comprises one or more parts 6', the role of which is to reflect the infrared radiation crossing the microbolometer, in order to improve its absorption yield, and several parts 6" serving as points of electrical contact with the readout circuit accommodated in the substrate 1.

Then a sacrificial layer 7 is deposited, for example of polyimide, which is annealed at a temperature sufficient for it to be able to support the remaining operations. Preferably, this layer 7 will be approximately 2.5 µm thick, in order to optimize the bolometer's optical yield (by the constitution of a "quarter-wave" cavity after elimination of this sacrificial layer) for wavelengths included within the infrared region.

According to this first embodiment of the invention, there is then deposited on this layer 7 a layer 8 of material sensitive to variations in temperature, for example 100 nanometers of amorphous silicon, of adequate resistivity, then a layer 9 of an electrical insulating material such as silicon oxide, from 5 to 20 nanometers thick for example.

This layer 9 is then etched opposite the zone 6' using a second lithographic mask, along the contour illustrated by a solid line in FIG. 2a. Then a layer 10 is deposited, which simultaneously covers the etched layer 9 and the layer 8 beyond the etched layer 9. This layer 10, which is made of a metal material such as titanium nitride TiN, will provide the electrodes of the sensitive part of the microbolometer, and also serve as infrared absorber. In order to optimize the microbolometer's yield, it will preferably have a layer resistance of approximately 400Ω, which usually corresponds to a thickness of less than 10 nanometers.

Figure 3A:
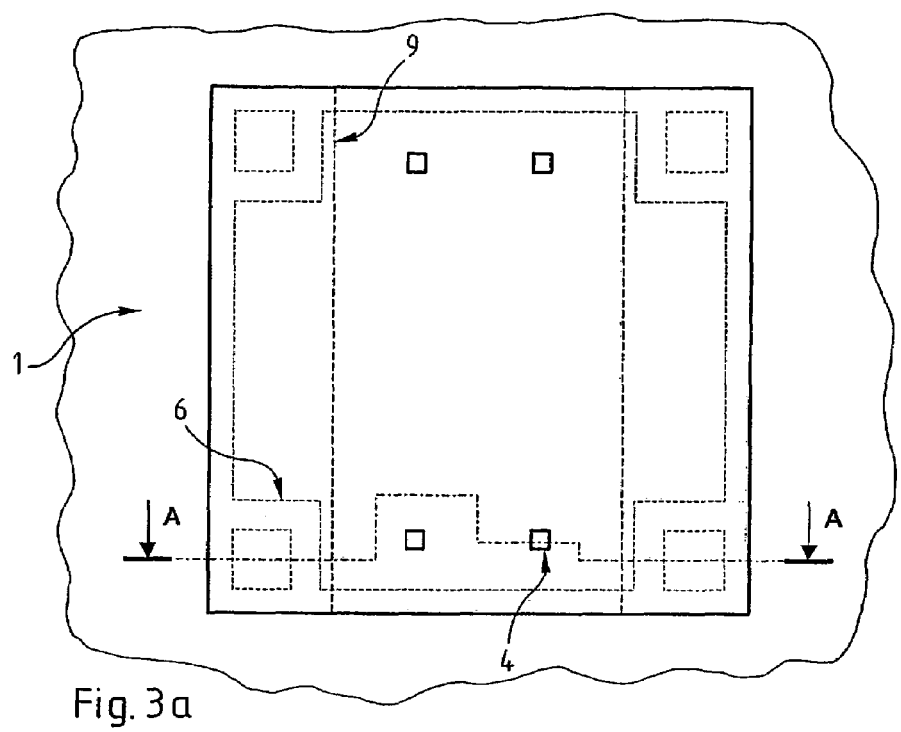
FIG. 3a is a top view of the assembly obtained after a second step in the manufacture of microbolometers according to the first embodiment of the invention.
Figure 3B:
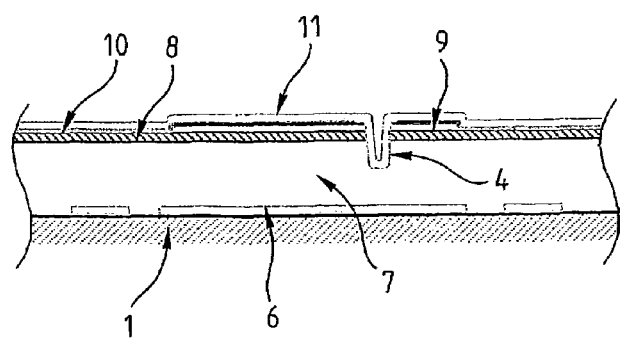

In a second step of this embodiment, illustrated in FIGS. 3a and 3b, using a third lithographic mask, by an appropriate dry etching process, the layers 10, 9 and 8 are etched, then part of the layer 7. Then, on the layer 10 and in the etched zones, a metal layer 11 is deposited, preferably of aluminium and between 50 to 200 nanometers thick.

This etching defines at least one first aperture facing a zone 6', of relatively small dimensions compared with the dimensions of the microbolometer. As can be seen in FIG. 3b, the depth of etching in the layer 7 defines the height of protuberances 4 from the layer 11 associated with these first apertures. This height will preferably be between 0.5 µm and 1.5 µm, in order to leave a sufficient margin between the end of the protuberances 4 and the surface of the layer 6.

Figure 4A:
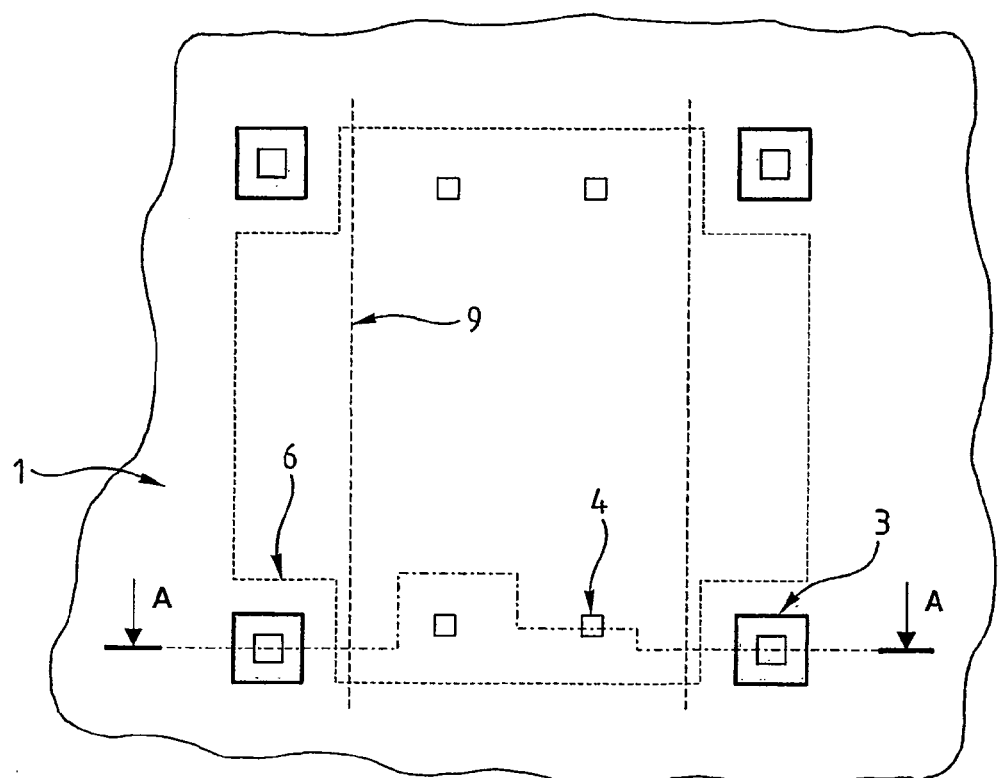
FIG. 4a is a top view of the assembly obtained after a third step in the manufacture of microbolometers according to the first embodiment of the invention.
Figure 4B:
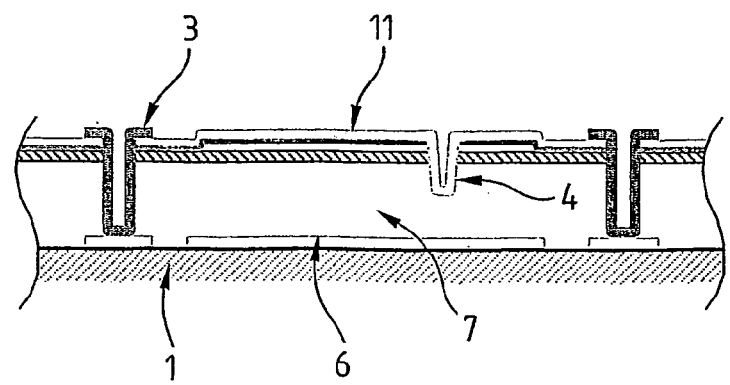

During a third step, represented in FIGS. 4a and 4b, using a fourth lithographic mask, second apertures are defined, situated opposite the zones 6", which will make it possible, using an appropriate dry etching process, to etch the layers 11, 10, 8 and 7 over their whole thickness through to the surface of the layers 6".

The choice of aluminium for the layer 11 makes it possible to use the latter as a mineral counter-mask for the etching of this sequence of materials.

Then at least one essentially metal layer is deposited, in order to produce parts 3 associated with said second apertures. These parts 3 are delimited at the surface by etching using a fifth lithographic mask represented in FIG. 4a. Struts supporting the mechanical structure are produced, as well as the electrical connections between the readout circuit and the future electrodes (see FIGS. 5a and 5b) of the microbolometer.

In this embodiment, a design with four struts 3 has been chosen, but other choices are possible, bearing in mind the need to produce relatively rigid structures as explained below.

Figure 5A:
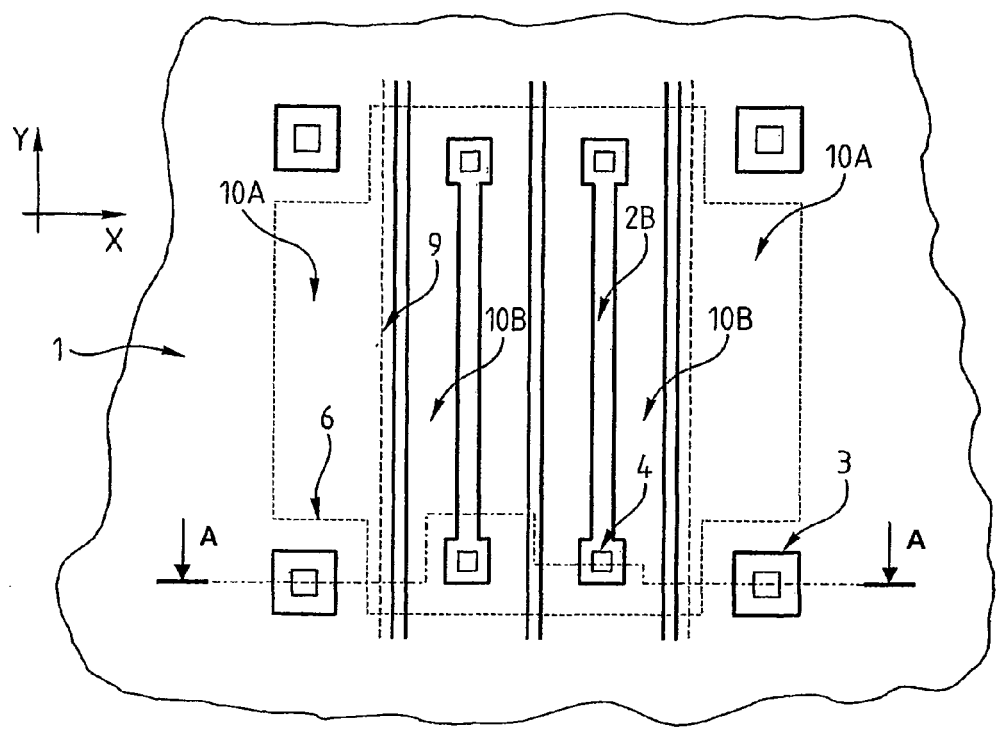
FIG. 5a is a top view of the assembly obtained after a fourth step in the manufacture of microbolometers according to the first embodiment of the invention.
Figure 5B:
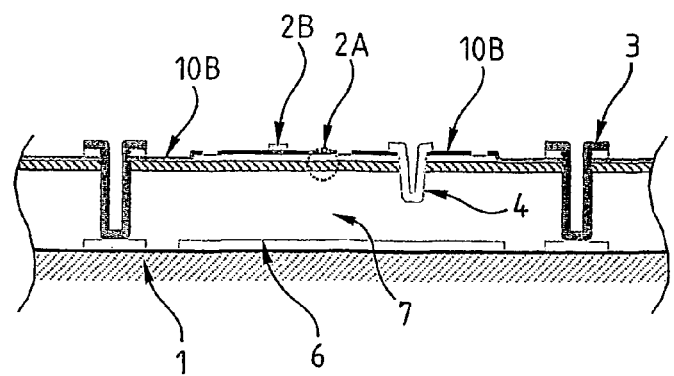

During a fourth step, a sixth lithographic mask is used, in order to define, by chemical etching, patterns in the layer 11, as represented in FIGS. 5a and 5b. These patterns comprise at least one surface 2B, essentially oblong in design, the direction of which is indicated by the Y axis in the figures, and the ends of which are situated at the protuberances 4, which must thus be protected, and also if necessary the zones 3, during this chemical etching.

The set of layers 8, 9 and 10 (essentially the layer 8 in this embodiment) defines a part 2A which, according to the invention, has a thermal expansion coefficient appreciably different from that of the part 2B, the parts 2A and 2B being superimposed and together forming the suspended part 2 of the microbolometer. If, for example, aluminium is used for the parts 2B, these will possess a thermal expansion coefficient equal to $25\times10^{-4}$/K whereas the silicon of which the layer 8 is made possesses a thermal expansion coefficient equal to $5\times10^{-4}$/k. A variant that can be chosen is to make the parts 2B from other materials having the same properties, such as silicon nitride, titanium nitride, tungsten or tungsten silicide; by doing so, preference will be given to materials that have a high modulus of elasticity compared with the materials constituting the parts 2A, in order to promote the deformation of the overall structure under the effect of heat, as described below with reference to FIGS. 7a and 7b.

Using a seventh lithographic mask, the metal layer 10 is then etched locally, in order to separate it into parts forming electrodes 10A, situated in particular at the zones 3, and into parts forming an infrared absorber 10B, as shown in FIGS. 5a and 5b. It will be noted that in this embodiment, the parts 2B are in electrical contact, on the one hand, with the parts 10B over their whole surface, and on the other hand with the sensitive element 8 of the detector by means of the protuberances 4. This is why, in this embodiment, the conductor 10B must be separated into electrically isolated zones each containing a single part 2B, in order to avoid short-circuiting this sensitive element (electrical resistance) 8. FIG. 5a shows (in solid lines) the zones of separation between the parts 10A and 10B as well as between the parts 10B themselves, all these zones of separation being here oriented parallel to the Y axis.

Other contours could have been used for the various polygons defined by the seventh mask, as well as for the polygons connected to the readout circuit (such as 10A), the polygon or polygons with floating potential (such as 10B), on condition, of course, that the points short-circuited by the zone or zones 2B are equipotential. In the opposite case, a person skilled in the art will be able to take the necessary precautions during assembly, by inserting for example a dielectric insulation layer in the right place, or even by using an insulating material for the parts 2B.

Figure 6A:
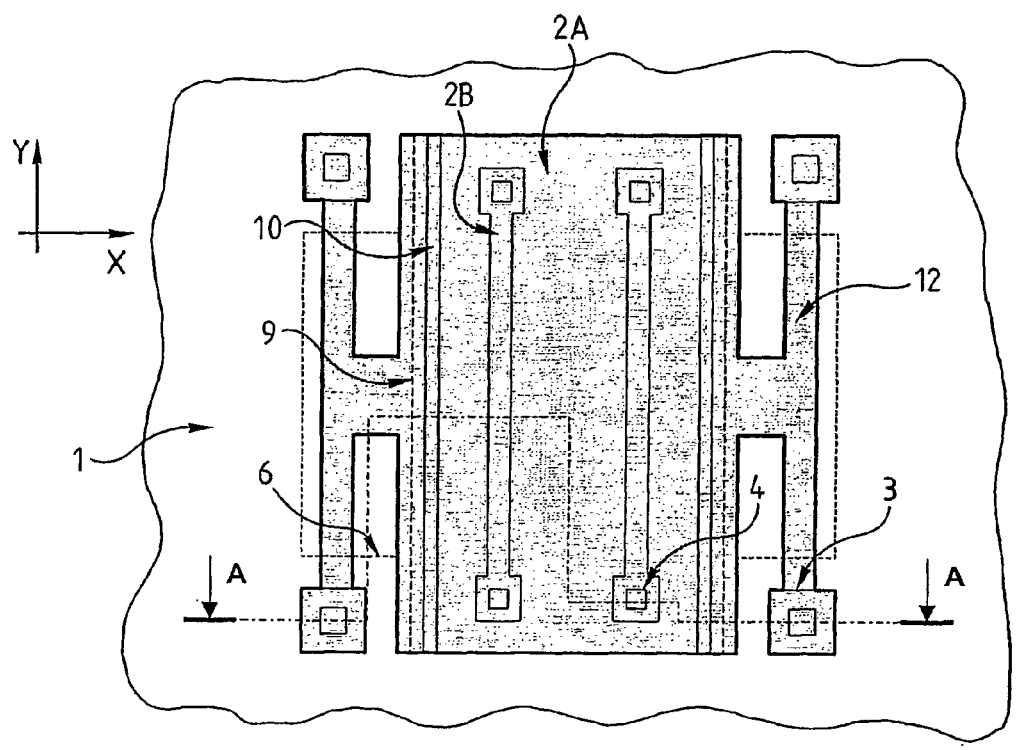
FIG. 6a is a top view of the assembly obtained after a fifth and last step in the manufacture of microbolometers according to the first embodiment of the invention.
Figure 6B:
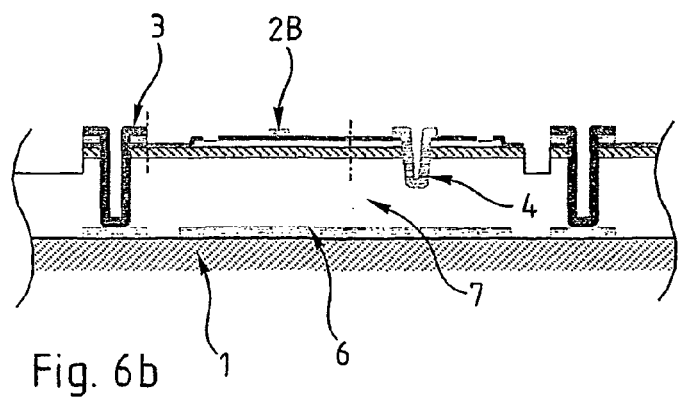

Finally, during a fifth step, an eighth and last lithographic mask is used in order to define the final contour of the microbolometers by dry etching of the layers 10A and 8 (as well as, partially, of the layer 7), as represented in FIGS. 6a and 6b. This contour retains the central, optically active, part 10B of the microbolometer, and defines thermal insulation arms 12 (numbering four in this embodiment), which have a significant effect on the value acquired by the microbolometer's "own" thermal resistance $R_{thb}$, i.e. of its suspended part. In this first embodiment, these arms 12 extend parallel to the Y axis, left and right, and on either side, of the median part of the suspended part 2.

This sequence of manufacturing steps ends with the elimination of the sacrificial layer 7 by dry oxidation, using well known techniques.

Thus, using this method according to the invention, a microbolometer has been obtained comprising a suspended part 2 containing a radiation-sensitive element and constituted by a set of first zones 2A and a set of second zones 2B, the two sets being superimposed, and the materials constituting the first zones 2A possessing appreciably different thermal expansion coefficients.

Figure 7A:
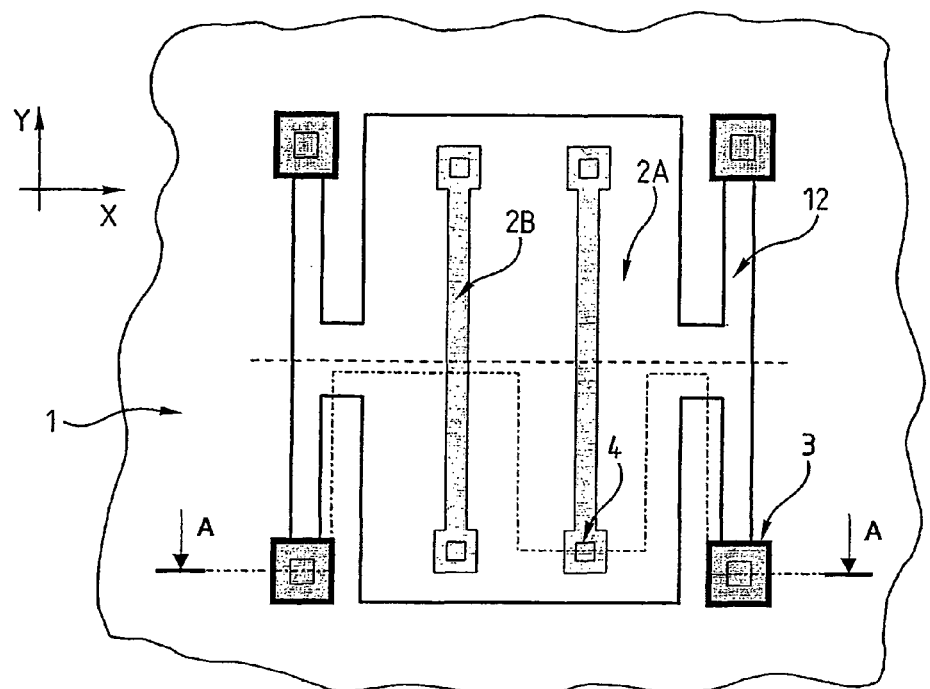
Figure 7B:
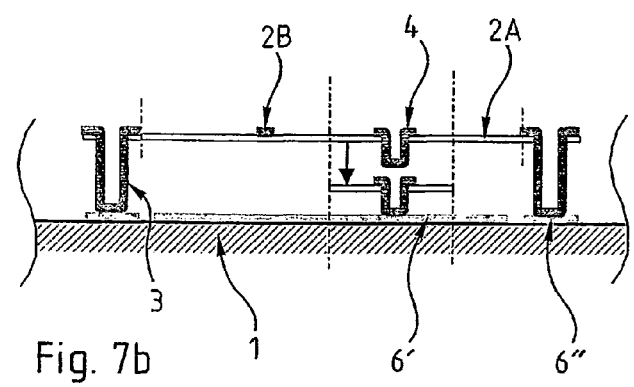

The operation of a microbolometer according to this first embodiment of the invention is illustrated in FIGS. 7a and 7b.

The temperature of the substrate $T_{sub}$ is generally monitored by an appropriate system, at a moderate temperature (ordinarily, slightly above the ambient temperature) for reasons of temporal stability of the electric operating points of the readout circuit and of the microbolometers (during non-operation, the temperature $T_{sub}$ is simply equal to the ambient temperature). The temperature of the microbolometers depends on the temperature of the source observed, as was mentioned in the introduction, as well as on the readout mode (i.e. the way in which the temperature readout stimuli are applied, via the electric circuit). Generally, the average temperature $T_{bol}$ of the microbolometers will be higher than that of the substrate, the difference ranging from some degrees to some tens of degrees.

In the case of excessive heating, for example due to a transient or durable illumination, the arms 12 will expand relatively little, due to the choice of materials from which they are made, and also because one of their ends is kept at the temperature of the substrate via the struts 3. In a first approximation, it can be considered that the set of structures comprising the struts 3, the support arms 12, and the connecting zones left and right of the central zone of the microbolometer in FIG. 7a, does not undergo any deformation. The same applies, by symmetry, to the zone situated along the median (dashed) line parallel to the X axis: all these zones remain at approximately the same distance from the substrate in the absence of mechanical contact with the latter. On the other hand, the zones situated on either side of this dashed line curve downwards due to the differential thermal expansion between the parts 2A and 2B, until they come locally into contact (here via the tops of the protuberances 4) with the substrate 1 (here, with the layer 6'), at a very precise temperature $T_c$.

As shown in FIG. 7b between the dash-dot lines, the protuberances 4 limit the contact surface between the suspended part 2 of the microbolometer and the substrate 1. This arrangement facilitates the return of the part 2 to its nominal position when the microbolometer cools down, without which the surface adhesion forces could keep it pinned down to the substrate.

In order to obtain a firm contact of the protuberances 4 on the reflector 6, it is advantageous to choose a structure with high rigidity. This rigidity is also necessary in order to ensure a return to their initial position of the deformed parts, after the part 2 has come locally into contact with the substrate 1: the elastic energy stored in the structure during the thermal expansion will be able to contribute to the "detachment" of the surfaces in contact during cooling down. A sufficient number of support points will therefore be provided, and preferably a coaxial configuration of the support arms.

On the other hand, the multiplication of the support points and support arms is in principle accompanied by a reduction in the microbolometer's own thermal resistance, and of its useful surface, and therefore its performance values.

A variant embodiment of the invention consists of producing, during a step preceding the steps described above, contact protuberances 5 on the surface of the substrate 1. These protuberances 5, which have a small surface compared with the surface of the microbolometer, can if appropriate be obtained by means of the natural topography of the readout circuit, involving no procedure or precaution other than a judicious positioning under the suspended part of the microbolometer. If this variant is chosen, it may be unnecessary to provide protuberances 4 on the microbolometer, and it is therefore possible to economize on the lithographic mask and the associated processes intended to produce the protuberances 4 (i.e. to forgo etching of the layer 7 during the step described with reference to FIGS. 3a and 3b).

Figure 8A:
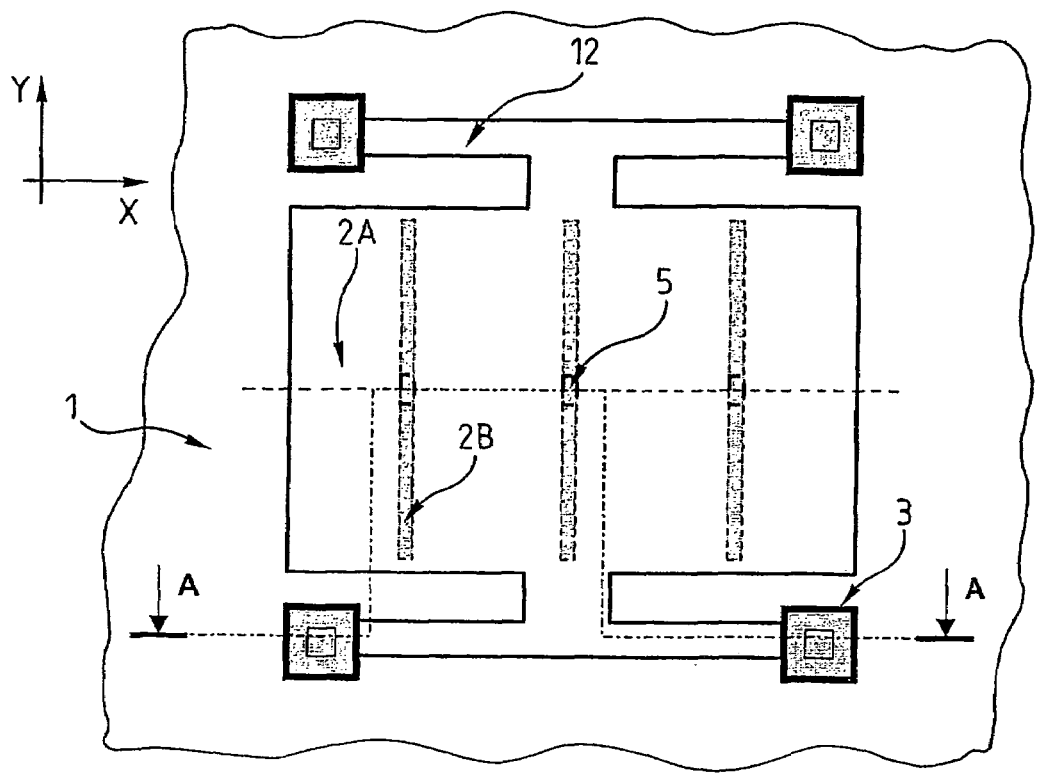
Figure 8B:
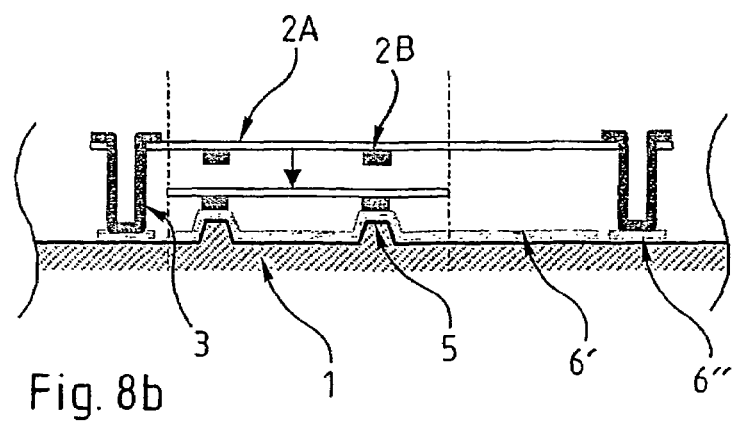

A second embodiment of the invention, represented in FIGS. 8a and 8b, consists of essentially implementing the same manufacturing steps as the first embodiment, except that the parts 2B are arranged "below" the parts 2A.

Here also, it is possible to provide protuberances 4 on the suspended part, or protuberances 5 on the substrate 1, or both types at the same time. In FIGS. 8a and 8b, it has been chosen by way of example to represent protuberances of the second type 5, which are situated facing the median axis (dashed line and parallel to the X axis in FIG. 8a) of the suspended part 2. FIG. 8b shows between the dash-dot lines how the suspended part 2 is deformed under the effect of heat until the zone situated along this median axis comes locally into contact with the protuberances 5.

This second embodiment makes it possible, by comparison with the first, to more easily arrange the contact zones 4 or 5 close to the centre of the microbolometer. In fact, the thermal deformation leads, in this embodiment, to a concave surface 2, such that it is the zones situated along said median axis which drop furthest towards the substrate 1 when the temperature increases, contrary to the first embodiment in which the rise in temperature leads to a convex surface 2.

It will be noted that the support arms 12 extend here in the direction X perpendicular to the direction Y along which the parts 2B extend, in order to effectively retain the suspended part 2, during its central drop, at the middle of each arm 12.

Of course, the nature of these deformations is reversed if the part 2B is made from with materials with a lower thermal expansion coefficient than those of the part 2A. A person skilled in the art naturally has the freedom to define his materials, and also to adapt the relative positions of the constituents, as a function of his practical needs, whilst remaining within the scope of the invention.

In particular, with the aim of simplifying the manufacture of radiation detectors according to the invention, but at the cost of reduced reliability, it is possible to omit all the protuberances 4 and 5.

Figure 1:
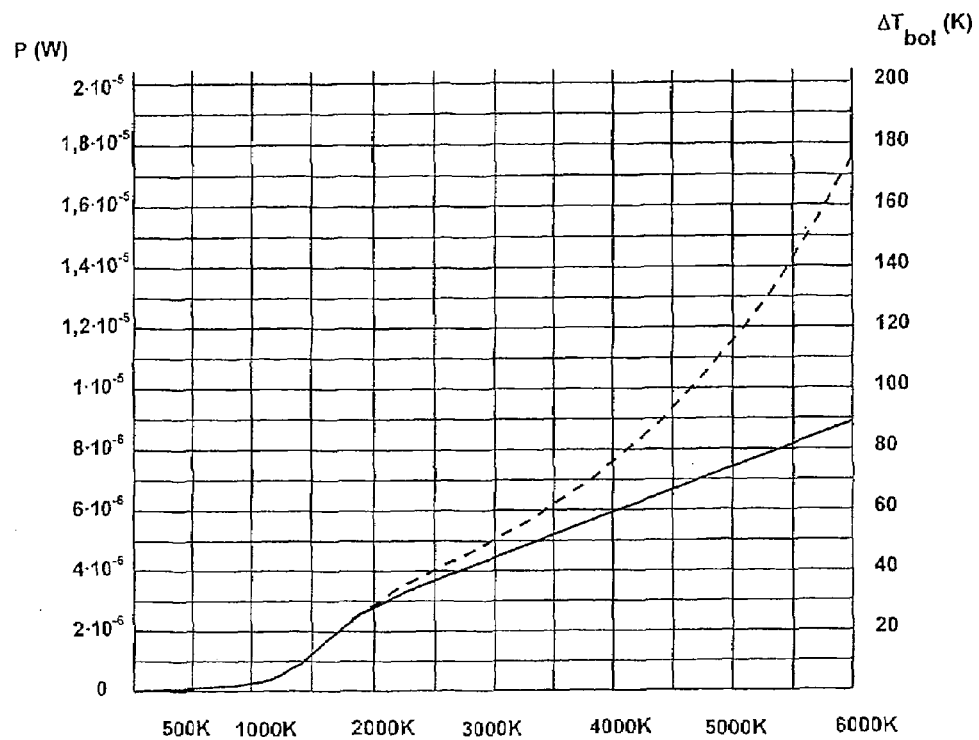
FIG. 1 represents the temperature reached by a standard microbolometer as a function of the black-body temperature of the of the source.
Figure 9:
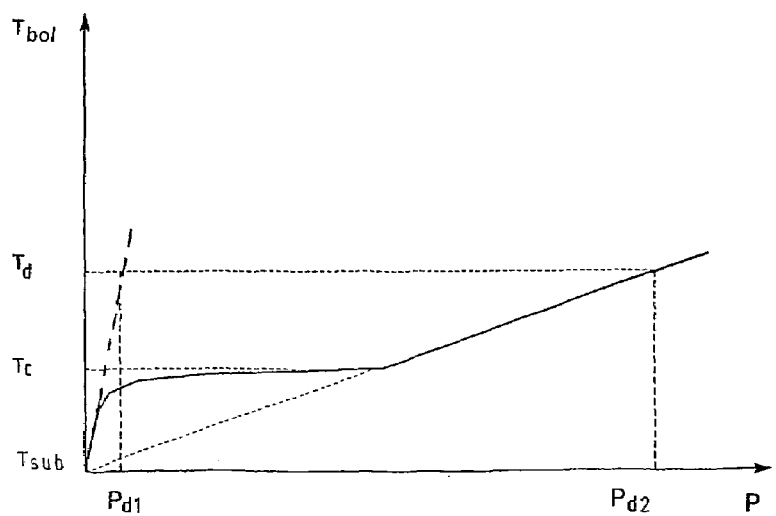
FIG. 9 is a graph of the temperature reached by a microbolometer according to the invention as a function of the power of the radiation received.

The effects of the invention are illustrated (with arbitrary scales) in FIG. 9, which is a graph of the temperature reached by a microbolometer as a function of the power P of the radiation received.

The mechanical contact at $T=T_c$, of the suspended part 2 and the substrate 1, is followed by a drop in the temperature of the whole of the part 2, by thermal conduction, since $T_{sub} < T_c$. The contact thermal resistance will be called $R_{thc}$. $R_{thc}$ depends on the effective area of the contact, the nature of the materials in contact, the geometrical configuration (shape of the parts 2A and 2B, number and shape of any contact zones at the top of the protuberances 4 and 5), and the nature of the materials constituting the parts 2.

It will be noted in this respect that, in the case where an embodiment is chosen including protuberances 4 and 5, the limitation of the contact surface which results from this has the effect of reducing the rate of cooling down of the suspended part 2 in contact with the substrate 1. A person skilled in the art must therefore seek the best compromise between ease of detachment and rate of cooling down.

Once the part 2 is in contact with the substrate, the overall thermal resistance, which will be designated $R_{thg}$, is constituted by two parallel resistances, i.e.:

$$R_{thg} = R_{thc} \cdot R_{thb} / (R_{thc} + R_{thb})$$

(it will be recalled that $R_{thb}$ describes the microbolometer's "own" thermal resistance).

As a function of the choice of materials, design and construction of the various elements according to the invention, a person skilled in the art can obtain thermal resistances $R_{thb}$ of the order of some $10^5$ to $10^6$ K/W, i.e. values which will easily be from ten to a hundred times smaller than the microbolometer's own thermal resistance. The overall thermal resistance $R_{thg}$ will therefore be of the order of the contact resistance $R_{thc}$.

For moderate values of P, the temperature increases linearly, in standard manner. For received powers of the order of $(T_c - T_{sub})/R_{thb}$, the microbolometer according to the invention oscillates (mechanically and in temperature), due to the alternation of phases of cooling in contact with the substrate and reheating after loss of contact.

For values greater than the received power, the part 2 is kept permanently in contact with the substrate, at an average temperature close to $(T_{sub} + P \cdot R_{thg})$.

The values of $R_{thg}$ being hypothetically clearly smaller than $R_{thb}$, accidental temperature deviations in the case of over-illumination are moderate compared with the deviations (represented by the dotted straight line in FIG. 9) which would be reached by a standard microbolometer.

Let $T_d$ be the temperature starting from which the microbolometer must be considered to have deteriorated or been destroyed, and $P_d$ the corresponding power received. For a given value of $T_d$, the invention makes it possible, by comparison with the prior art, to increase the power which can be applied before destruction by a factor equal to $$P_{d2}/P_{d1} = R_{thb}/R_{thg},$$

a factor of the order of ten or a hundred depending on the microbolometer's design details.

In the above description, reference has been made to microbolometers in order to fix ideas, but in fact the elementary detectors covered by the invention can be of many kinds, and not only microbolometers; similarly, the range of wavelengths which they can detect is by no means limited to the infrared, and the uses of these detectors cover many fields (for example spectroscopy), and not only imaging. The invention can be used, in its various aspects, to benefit various devices which may suffer from excessive heating during use, such as for example MEMS (Micro-Electro-Mechanical Systems).

The invention claimed is:

1. A microbolometer comprising a suspended part containing a radiation-sensitive element having a variable electrical resistance depending on an intensity of radiation, wherein the suspended part comprises a set of first zones and a set of second zones, the sets of first and second zones being superimposed, and wherein the materials constituting the first zones possess thermal expansion coefficients sufficiently different from the materials constituting the second zones such that the suspended part is deformed under the effect of a rise in temperature to the point of coming into contact with an associated substrate when a contact zone reaches a temperature $T_c$ below the destruction temperature $T_d$ of the microbolometer.

2. The microbolometer according to claim 1, wherein the first zones are situated below the second zones.

3. The microbolometer according to claim 1, the first zones are situated above the second zones.

4. The microbolometer according to claim 1 wherein the first zones possess a thermal expansion coefficient smaller than that of the second zones.

5. The microbolometer according to claim 1, wherein the first zones possess a thermal expansion coefficient greater than that of the second zones.

6. The microbolometer according to claim 1, wherein the suspended part includes protuberances turned towards the substrate.

7. The microbolometer according to claim 1, wherein the substrate includes protuberances turned towards the suspended part.

8. The microbolometer according to claim 1, wherein the suspended part includes support arms resting locally on the substrate by means of struts.

9. The microbolometer according to claim 1, wherein the contact zone includes the center of the suspended part.

10. The microbolometer according to claim 1, wherein contact zone is remote from the center of the suspended part.

11. A radiation detector comprising an array of microbolometers according to claim 1.

12. An observation or measuring apparatus, including at least one radiation detector according to claim 11.

13. A method for manufacturing microbolometers on a substrate, comprising the following steps:
- depositing and etching several layers, including a set of layers forming a suspended part of a microbolometer containing a radiation-sensitive element having a variable electrical resistance depending on an intensity of radiation; and
- forming a set of superimposed first zones and a set of second zones in the suspended part,
- wherein the materials constituting the first zones possess thermal expansion coefficients sufficiently different from the materials constituting the second zones such that the suspended part is deformed under the effect of a rise in temperature to the point of coming into contact with an associated substrate when the contact zone reaches a temperature $T_c$ below the destruction temperature $T_d$ of the microbolometer.

14. The manufacturing method according to claim 13, further comprising producing protuberances emanating from the suspended part and turned towards the substrate.

15. The manufacturing method according to claim 13, further comprising producing protuberances emanating from the substrate and turned towards the suspended part.

16. The manufacturing method according to claim 13, further comprising producing struts resting on the substrate and producing arms of the suspended part resting locally on the struts.

* * * * *